US011431596B1

(12) United States Patent
Rajasekharan et al.

(10) Patent No.: US 11,431,596 B1
(45) Date of Patent: Aug. 30, 2022

(54) REAL-TIME MANAGEMENT OF DEVICE MAINTENANCE

(71) Applicant: Hach Company, Loveland, CO (US)

(72) Inventors: Vishnu Vardhanan Rajasekharan, Fort Collins, CO (US); Russell Young, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 0 days.

(21) Appl. No.: 17/174,945

(22) Filed: Feb. 12, 2021

(51) Int. Cl.
| | |
|---|---|
| *H04L 43/065* | (2022.01) |
| *G06Q 10/00* | (2012.01) |
| *H04L 41/0681* | (2022.01) |
| *G01F 23/2962* | (2022.01) |
| *G01F 1/05* | (2006.01) |
| *G01F 15/075* | (2006.01) |

(52) U.S. Cl.
CPC .......... *H04L 43/065* (2013.01); *G06Q 10/20* (2013.01); *H04L 41/0681* (2013.01); *G01F 1/05* (2013.01); *G01F 15/0755* (2013.01); *G01F 23/2962* (2013.01)

(58) Field of Classification Search
CPC .... G16H 50/30; G06Q 50/06; G01K 2207/00; G01K 13/02; G01K 13/026; G01F 15/063; G01F 15/066
See application file for complete search history.

(56) References Cited

U.S. PATENT DOCUMENTS

| | | | | |
|---|---|---|---|---|
| 10,526,771 | B1 * | 1/2020 | Devereaux | .............. E03B 7/003 |
| 2007/0257806 | A1 * | 11/2007 | Madden | ................. G01N 33/18 73/61.41 |
| 2008/0230146 | A1 * | 9/2008 | Kastner | .................... B67D 7/76 702/50 |
| 2012/0125442 | A1 * | 5/2012 | Sutherland | .............. E02F 9/268 137/558 |
| 2015/0053596 | A1 | 2/2015 | Kageyama et al. | |
| 2015/0224525 | A1 * | 8/2015 | Klicpera | ................... E03C 1/04 4/615 |
| 2016/0011036 | A1 * | 1/2016 | Wiersma | ............. G01F 23/2962 73/290 V |

(Continued)

FOREIGN PATENT DOCUMENTS

WO    WO2018035568 A1    3/2018

OTHER PUBLICATIONS

European Patent Office, International Search Report and Written Opinion, dated May 3, 2022, 5 pages.

*Primary Examiner* — Barbara B Anyan
(74) *Attorney, Agent, or Firm* — Ference & Associates LLC

(57) ABSTRACT

An embodiment provides a method for real-time management of device maintenance utilizing quality metrics defined based upon inputs of the device, the method including: receiving inputs corresponding to a particular device, wherein the particular device provides measurements of a parameter of a fluid; generating, from the inputs, quality metrics for and unique to the particular device; monitoring the particular device while the particular device is deployed, wherein the monitoring occurs in view of the quality metrics; and triggering, responsive to detecting information corresponding to the particular device is violating at least one of the quality metrics, a notification to a user to perform an action corresponding to the particular device.

18 Claims, 2 Drawing Sheets

(56) References Cited

U.S. PATENT DOCUMENTS

| | | | |
|---|---|---|---|
| 2016/0076909 A1* | 3/2016 | Klicpera | G01F 15/0755 73/198 |
| 2018/0121889 A1 | 5/2018 | Subbarayalu Venkitapathi et al. | |
| 2019/0167188 A1* | 6/2019 | Gifford, III | G16H 50/30 |
| 2019/0358387 A1* | 11/2019 | Elbadry | A61M 1/3663 |
| 2020/0064172 A1* | 2/2020 | Tabaczewski | A61B 5/201 |
| 2020/0089190 A1* | 3/2020 | Vandergon | G05B 23/0221 |
| 2020/0114073 A1* | 4/2020 | Kolko | G01F 1/05 |
| 2020/0331772 A1 | 10/2020 | Johnson et al. | |

\* cited by examiner

US 11,431,596 B1

REAL-TIME MANAGEMENT OF DEVICE MAINTENANCE

FIELD

This application relates generally to fluid parameter measurements, and, more particularly, to real-time management of device maintenance of devices measuring fluid parameters.

BACKGROUND

Ensuring water quality is critical in a number of industries such as pharmaceuticals and other manufacturing fields. Additionally, ensuring water quality is critical to the health and well-being of humans, animals, and plants which are reliant on the water for survival. To determine the water quality devices are deployed that measure different parameters of the water. Similarly, devices can be deployed to measure different parameters of any fluid. Since different devices may measure different parameters, the measurement data from each of the devices is combined in order to determine the overall quality or other multi-parameter measurements or values.

BRIEF SUMMARY

One embodiment provides a method for real-time management of device maintenance utilizing quality metrics defined based upon inputs of the device, the method including: receiving inputs corresponding to a particular device, wherein the particular device provides measurements of a parameter of a fluid; generating, from the inputs, quality metrics for and unique to the particular device; monitoring the particular device while the particular device is deployed, wherein the monitoring occurs in view of the quality metrics; and triggering, responsive to detecting information corresponding to the particular device is violating at least one of the quality metrics, a notification to a user to perform an action corresponding to the particular device Another embodiment provides a system for real-time management of device maintenance utilizing quality metrics defined based upon inputs of the device, the system including: a particular device; a memory storing instructions executable by a processor to: receive inputs corresponding to a particular device, wherein the particular device provides measurements of a parameter of a fluid; generate, from the inputs, quality metrics for and unique to the particular device; monitor the particular device while the particular device is deployed, wherein the monitoring occurs in view of the quality metrics; and trigger, responsive to detecting information corresponding to the particular device is violating at least one of the quality metrics, a notification to a user to perform an action corresponding to the particular device.

A further embodiment provides a system for real-time management of device maintenance utilizing quality metrics defined based upon inputs of the device, the system including: a plurality of devices that measure parameters of a fluid; a memory storing instructions executable by a processor to: receive inputs corresponding to a particular device of the plurality of devices, wherein the particular device provides measurements of one of the parameters of a fluid; generate, from the inputs, quality metrics for and unique to the particular device; monitor the particular device while the particular device is deployed, wherein the monitoring occurs in view of the quality metrics; and trigger, responsive to detecting information corresponding to the particular device is violating at least one of the quality metrics, a notification to a user to perform an action corresponding to the particular device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
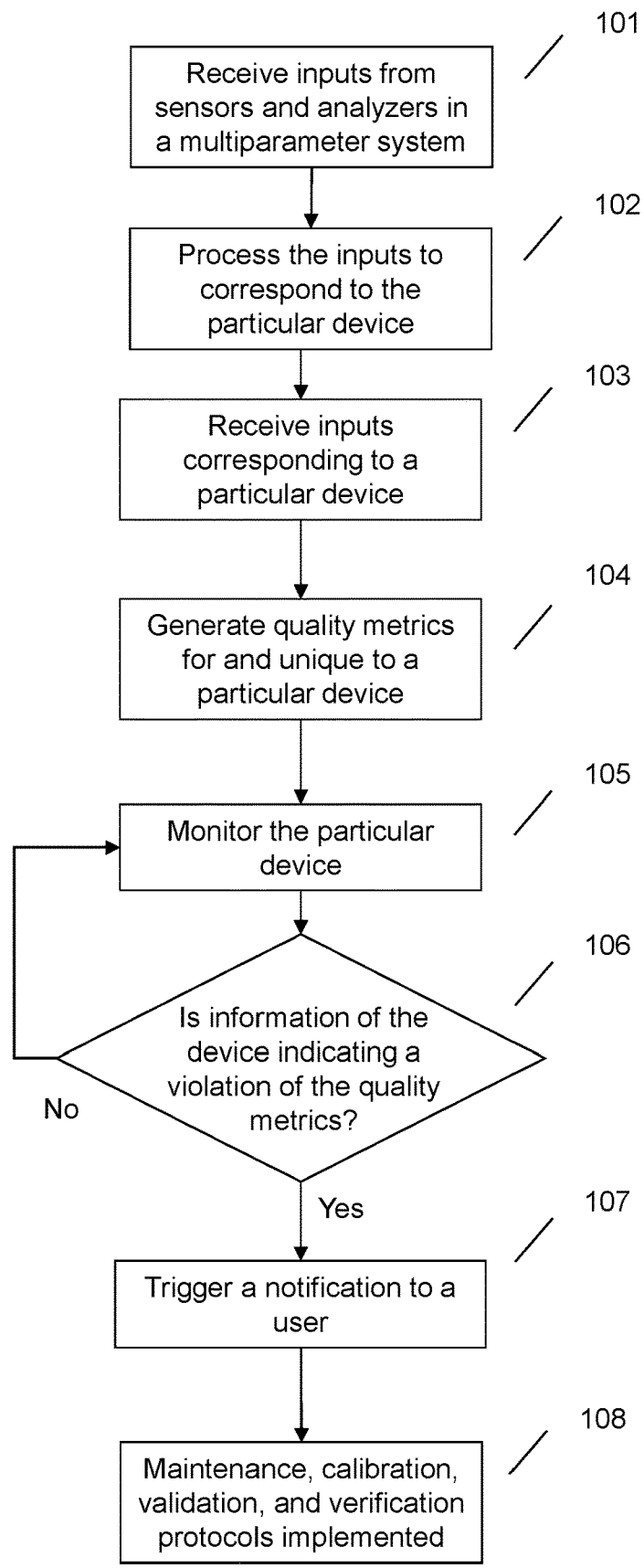
FIG. 1 illustrates an example method for real-time management of device maintenance utilizing quality metrics defined based upon inputs of the device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Traditionally, even though multiple devices may be providing measurement data for parameters of the same fluid, these devices are not generally connected together within a system. Rather, each of the devices provides the measurement data to a central device and the device aggregates the measurement data from all the devices to provide the desired overall multi-parameter measurement data. Additionally, customers must maintain, clean, and calibrate each of the devices under different protocols which is cumbersome to maintain. The maintenance and calibration protocols are time-based, meaning the protocols indicate that maintenance should be performed at specific time intervals. Since different factors may result in different operating conditions for and degradation of devices, even of the same type, the time-based approach results in some devices being over-maintained and some devices being under-maintained. This results in higher costs and also compromises performance of the devices, thereby resulting in measurement data that is compromised and unreliable.

Accordingly, an embodiment provides a system and method for real-time management of device maintenance utilizing quality metrics defined based upon inputs from the device and from its environment. Instead of relying on a time-based approach, the described system and method can generate quality metrics and, in some cases, diagnostic aspects for each device within a system. The devices in the system may work together to each provide parameter measurements that can then be used to determine an overall value or index. Using the quality metrics and/or diagnostic aspects, the system can monitor each of the devices in view of the quality metrics generated for that device. The monitoring occurs while the device is deployed, so any detection of violations of the quality metrics or deviations from the diagnostic aspects occurs in real-time. If a violation or deviation is detected, the system can send a notification to a user that a corrective action needs to be taken with respect to the device. For example, the system may indicate that the device needs maintenance, calibration, component replacement, or the like.

Accordingly, the system provides maintenance indications on-demand instead of relying on time-based techniques. The on-demand or real-time maintenance indications provide a system that results in devices that are maintained when necessary as opposed to under-maintained or over-maintained as found in conventional systems. Additionally, since devices are not being maintained when maintenance is not needed, costs and labor associated with maintenance are reduced. Additionally, since the devices are properly maintained the measurement data being provided by the devices is more accurate and is not compromised as in conventional systems. Since the confidence in the measurement data from each of the devices is higher, the confidence in values/information derived or based upon multi-parameter measurement data is also higher. Thus, the system provides a more cost effective technique that results in better quality measurement data and better quality overall multi-parameter measurement information as compared with conventional techniques.

The illustrated example embodiments will be best understood by reference to the figures. The following description is intended only by way of example, and simply illustrates certain example embodiments.

FIG. 1 illustrates an example method for real-time management of device maintenance utilizing quality metrics defined based upon inputs of the device. At 101 the system may receive inputs from sensors, analyzers, or other instruments or devices in a multi-parameter system. The system can then process these inputs to correlate the inputs to a particular device at 102. Thus, at 103 the system receives inputs corresponding to a particular device (e.g., probe, sensor, measurement equipment, etc.). Alternatively, if the device is not in a multi-parameter system, the system may simply receive inputs from the device at 103 and may not perform steps 101 or 102.

The described system and method provides quality metrics, diagnostic aspects, and monitoring for each device individually and unique from other devices that may be deployed within a system or in the same fluid. Some example quality metrics include relative standard deviation, light transmittance percentage at the interface of the sample and measuring material, difference in flow rates, difference in temperature, difference in pressure, difference in color, light source intensity, relational dependence between inter-dependent parameters, impedance across the transducer, resistance across the junction/frit in a reference electrode, and the like. Accordingly, the inputs received at 103 are unique for each device. However, some input values may be the same across multiple devices. The device, referred to as a particular device, provides measurements of parameters of a fluid, for example, water, effluent, influent, or the like. Some example parameters may include pH, alkalinity, hardness, conductivity, free chlorine, total chlorine, total dissolved solids, and/or the like. While a single device may measure a single parameter, to get an overall picture of a fluid, multiple devices may be deployed within the fluid, with at least some of the devices measuring different parameters within the fluid. Accordingly, the particular device may be one of a plurality of devices within a system providing measurement data regarding parameters of the fluid.

The inputs received at 103 provide an indication or identification of different attributes that may affect the performance, degradation, measurement values, or the like of the particular device. Thus, the inputs may include inputs identifying attributes of the device, inputs identifying operating conditions or attributes of an environment of the device, inputs identifying an application of the device, and/or the like. Examples of inputs identifying attributes of the device include, but are not limited to, make and model of the device, calibration status, length of deployment, time of last service, different components within the device, parameter being measured by the device, sensitivity of the device, and/or the like. Examples of inputs identifying operating conditions or attributes of an environment of the device include, but are not limited to, environmental temperature, fluid temperature, causticity of the fluid, fluid volume, geographical features, weather information, and/or the like. Examples inputs identifying an application of the device include, but are not limited to, identification of a multi-parameter value or composite index that is utilizing the measurement data of the device, function of the overall system (e.g., treatment facility, distribution facility, manufacturing facility, etc.), function of the fluid (e.g., effluent, influent, potable water, etc.), and/or the like.

At 104 the system generates quality metrics for and unique to the particular device from the inputs received at 103. Quality metrics may identify thresholds, ranges, or other indicators of values that may be received from the device that indicate a desired performance of the device. The system may also generate diagnostic aspects for and unique to the particular device. Diagnostic aspects identify different thresholds, ranges, or other indicators of values that may be received from the device that indicate action should be taken with respect to the device. Generation of the quality metrics and/or diagnostic aspects are defined and generated based upon the application of the particular device and a type of composite index or overall value that will be derived from individual parameters being measured by each of the devices within a system.

Specifically, the system identifies or defines performance parameters for each device based upon the application and a type of composite index or overall value that will be derived from the individual parameters. The performance parameters may also be based, at least in part, on some of the inputs received at 103. For example, a sensitivity of the device may define how accurate the measurements of the device are, thereby affecting the performance parameters of the device. Once the performance parameters are defined, the system can generate the quality metrics and/or diagnostic aspects. In generating the quality metrics and/or diagnostic aspects, the system aggregates the inputs received at 103 to identify factors from the inputs that will affect the performance of the device. For example, environmental condition may affect how quickly a device degrades. As another example, if the device is within a caustic environment, the device may degrade more quickly than the same type of device in a non-caustic environment. As another example, the experience of the operator in handing the instrument may affect how the instrument performs or how often the device needs calibrated. As a final, non-limiting example, the age of a device may affect how quickly the device needs calibrated. The identified factors are used to generate the quality metrics and/or diagnostic aspects.

Once the quality metrics and/or diagnostic aspects are generated, the system develops algorithms that trigger customized maintenance triggers for each device. Thus, at 105 the system monitors the device while the device is deployed. While monitoring the device, the system compares different information or outputs provided by the device, information from the environment of the device, or the like, against the quality metrics and/or diagnostic aspects. Accordingly, the monitoring occurs in view of the quality metrics and/or diagnostic aspects. As an example, the system may receive electrical information from a sensor within the device. This electrical information may be compared against the quality metric and/or diagnostic aspect while the device is deployed. As another example, the system may receive indications of environmental conditions that can be compared against the quality metric and/or diagnostic aspect. An environmental condition, for example, temperature, violating the quality metric and/or deviating from the diagnostic aspect would indicate additional action may need to be taken.

Accordingly, at 106, the system determines if the information of the device, environmental conditions, or the like, is indicating a violation of the quality metrics and/or a deviation from the diagnostic aspects. The indication may be that the values or output being received is outside a threshold, range, or other parameter as compared to the corresponding quality metric and/or diagnostic aspect. If there is no violation or deviation detected at 106, the system may continue to monitor the device in view of the quality metrics and/or diagnostic aspects at 105.

If, on the other hand, a violation or deviation is detected at 106, the system will trigger a notification to a user to perform an action corresponding to the particular device at 107. In other words, responsive to detecting that the information corresponding to the particular device is violating at least one of the quality metrics and/or is deviating from at least one of the diagnostic aspects, the system may trigger a notification of the same to the user. The notification may be any type of notification (e.g., pop-up window, transmission of a message to another device, alert on the device or a central device receiving information from the device itself, transmission to print a document, etc.) and may be presented on the device itself, a second device, or the like. The notification may indicate that the user needs to perform a particular action with respect to the device in order to bring it into compliance with the quality metric and/or diagnostic aspect. The action may be a corrective action for example, device maintenance, device calibration, component replacement, or the like.

Based upon the output information and/or identifying which quality metric and/or diagnostic aspect is being violated or deviated from, the system may identify which of the corrective actions should be taken. For example, deviation from one quality metric may indicate that maintenance needs to be performed, while deviation from a different quality metric may indicate that a component of the device needs to be replaced. Additionally, the system may perform other functions if a violation or deviation is detected. For example, the system may validate the performance of other devices within the system based upon detecting a deviation from a diagnostic aspect by one device within the system. Thus, the maintenance, calibration, validation, verification of protocols, and the like, are implemented at 108.

The system also provides that a user of the system can provide input to the system to modify how quality metrics are generated, how frequently monitoring occurs, when notifications are triggered, and the like. For example, one user, depending on the application, may have a higher risk tolerance and so may want wider quality metric tolerances, less frequent monitoring, and/or more flexibility regarding when notifications are triggered as opposed to a user having a lower risk tolerance. Thus, the described system optimizes cost and performance of devices while still maintaining an accuracy of the devices via maintenance (e.g., maintenance, calibration, component replacement, etc.) using an on-demand or condition/event-based maintenance notification as opposed to a time-based maintenance schedule.

Some overall examples of the full system including the device, auxiliary diagnostic measurements, inputs, quality metrics, and actions, are provided as follows. These examples illustrate use cases where internal information from the device, external information from the process, and metadata from the environment are used to provide real-time, on-demand maintenance of a multiparameter system to increase the performance of the devices while reducing the overhead the results from unnecessary time-based maintenance as found in current systems. As one example, the multiparameter system is an optical system having the following devices: spectrophotometric probes and analyzers. In this example, the parameters that are measured are turbidity, UV 254, color, Total organic carbon, Dissolved organic carbon, and chemical oxygen demand. Auxiliary diagnostic measurements that are incorporated in the devices include flow, temperature, pressure, and auxiliary light transmittance. In this example system, the quality metrics and inputs with threshold values are relative standard deviation having a threshold value of 0.1 to 5% depending on the application (e.g., 0.1% of filtered final effluent, 5% in water reuse applications, etc.), light transmittance percentage at the interface of the sample and measuring material having a threshold value of less than 5% of the typical value, difference in flow rates having a threshold value of +/−5% of the typical values, difference in temperature having a threshold value of +/−5% of the typical values, difference in pressure having a threshold value of +/−5% of the typical values, difference in color having a threshold value of +/−5% of the typical values, light source intensity having a threshold value of +/−5% of the typical values, relational dependence between interdependent parameters (e.g., turbidity and UV/Vis transmittance) having a threshold value of +/−5% direct correlation. In the event that the quality metrics or inputs do not meet the threshold values and the performance metrics of the system are met, then mitigation actions may be implemented. For example, in the event that the relative standard deviation fail to meet the threshold values, instrument calibration may need to be performed, electrical and/or optical component validation and/or replacement may need to be performed, or the like. As another example, if the light transmittance percentage does not meet the threshold values, mitigation actions may include cleaning of the sample/sensing system interface, a physical and chemical cleaning system needs to be implemented, or the like. Other example mitigation actions based upon the different quality metrics/ inputs not meeting threshold values may include checking for blockages, checking for leakages in the measuring device, temperature compensation and thermistor performance needs to be checked, dilution or concentration protocols may need to be implemented, amplification or attenuation of the light source, replacement of the light source, checking the light source, signal transduction, calibration and invocation of maintenance protocols, or the like.

As another example, the multiparameter system is an electrochemical system with the following devices: ion selective probes, potentiometric devices, and voltammetric devices that measure pH, oxidation reduction potential, ammonia, and nitrate parameters, amperometric devices that measures the chlorine parameter, and alternative current devices that measure the conductivity parameter. These devices may also provide the auxiliary diagnostic measurements including secondary measuring systems to determine impedance, resistance, volume, level, flow, pressure, and temperature. The quality metrics/inputs and corresponding threshold values may include impedance across the transducer having a threshold value of +/−5% of the typical values, resistance across the junction/frit in the reference electrode having a threshold value of +/−5% of the typical values, volume and level of inner fill solution having a threshold value of +/−5% of the typical values, difference in flow rates having a threshold value of +/−5% of the typical values, difference in temperature having a threshold value of +/−5% of the typical values, difference in pressure having a threshold value of +/−5% of the typical values, and relational dependence between pH and conductivity having a threshold value of the lower of the pH and the higher of the conductivity. Example mitigation actions may include checking for any fluid leakage through the transducer, checking the fluid flux across the reference electrode junction, chemically cleaning the junction or replacing the junction, checking for blockages or leakages in the measuring devices, temperature compensation and thermistor performance needing checked, calibration of the pH and conductivity and invocation of the maintenance protocols, and the like.

Figure 2:
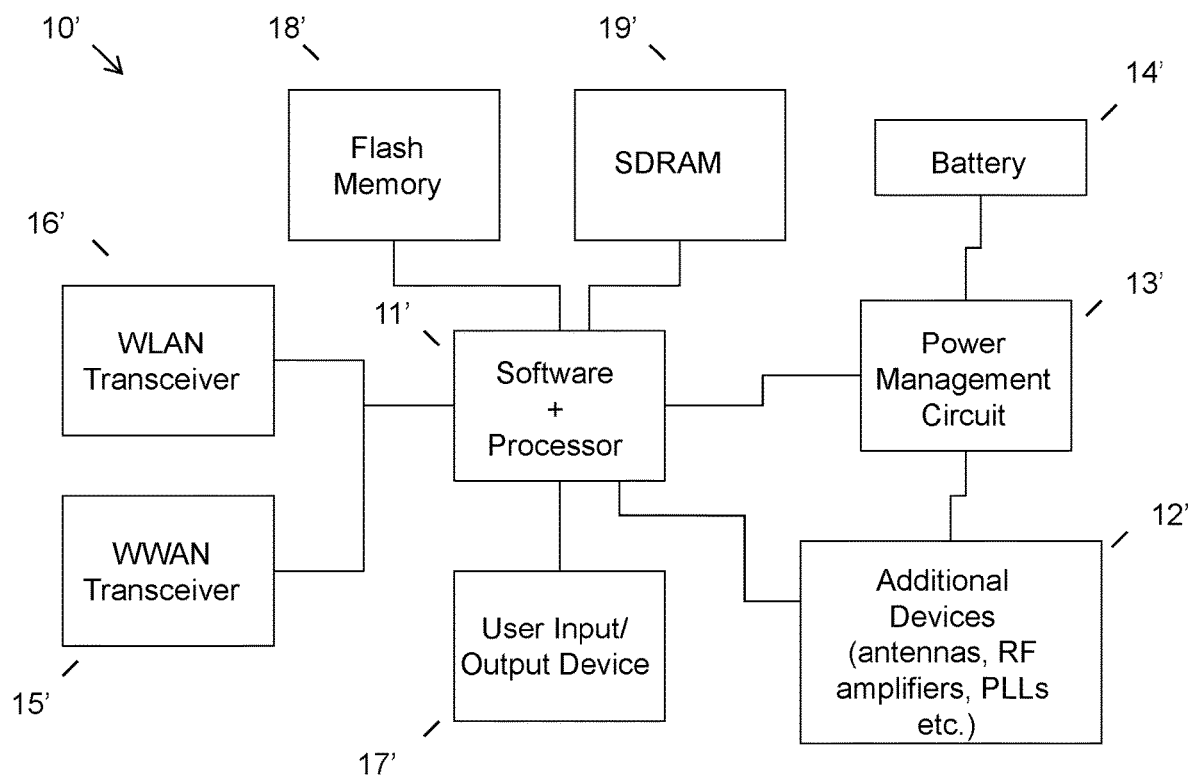
FIG. 2 illustrates an example of computer circuitry.

While various other circuits, circuitry or components may be utilized in information handling devices, with regard to an instrument for alkalinity measurement according to any one of the various embodiments described herein, an example is illustrated in FIG. 2. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as an instrument, system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for real-time management of device maintenance utilizing quality metrics defined based upon inputs of the device, the method comprising:
   receiving inputs corresponding to a particular device within a system of a plurality of devices, wherein the particular device provides measurements of a parameter of a fluid, wherein the inputs correspond to attributes corresponding to a performance of the particular device;
   generating, from the inputs, quality metrics for and unique to the particular device, wherein the generating comprises generating diagnostic aspects for and unique to the particular device, wherein the diagnostic aspects provide indicators of values corresponding to the inputs that indicate action with respect to the particular device is needed, wherein the quality metrics and diagnostic aspects are generated from performance parameters defined for the particular device and wherein the performance parameters are based upon a type of composite index that will be derived from the measurements provided by the plurality of devices;

monitoring the particular device while the particular device is deployed, wherein the monitoring occurs in view of the quality metrics, wherein the monitoring is performed in view of algorithms that trigger customized maintenance triggers for the particular device developed from the quality metrics and diagnostic aspects; and triggering, responsive to detecting information corresponding to the particular device is violating at least one of the quality metrics, a notification to a user to perform an action corresponding to the particular device and the customized maintenance trigger.

2. The method of claim 1, wherein the inputs comprise at least one of: device attributes, attributes of an environment the particular device is within, and an application of the particular device.

3. The method of claim 1, wherein the composite index is derived from the parameter of the fluid measured by the particular device and other parameters of the fluid measured by other devices within a device system including the particular device.

4. The method of claim 1, wherein the monitoring is further performed in view of the diagnostic aspects.

5. The method of claim 4, wherein the triggering comprises triggering the notification based upon a deviation from the diagnostic aspects.

6. The method of claim 4, comprising validating, responsive to detecting a deviation from the diagnostic aspects during the monitoring, a performance of at least one other device in a system of a plurality of devices including the particular device using the deviation.

7. The method of claim 1, wherein the monitoring comprises monitoring outputs of the particular device against the quality metrics.

8. The method of claim 1, wherein the action comprises at least one: maintenance of the particular device, calibration of the particular device, and replacement of a component of the particular device.

9. The method of claim 1, wherein the particular device is one of a plurality of devices measuring parameters of the fluid.

10. A system for real-time management of device maintenance utilizing quality metrics defined based upon inputs of the device, the system comprising:

a particular device;

a memory storing instructions executable by a processor to:

receive inputs corresponding to a particular device within a system of a plurality of devices, wherein the particular device provides measurements of a parameter of a fluid, wherein the inputs correspond to attributes corresponding to a performance of the particular device;

generate, from the inputs, quality metrics for and unique to the particular device, wherein the generating comprises generating diagnostic aspects for and unique to the particular device, wherein the diagnostic aspects provide indicators of values corresponding to the inputs that indicate action with respect to the particular device is needed, wherein the quality metrics and diagnostic aspects are generated from performance parameters defined for the particular device and wherein the performance parameters are based upon a type of composite index that will be derived from the measurements provided by the plurality of devices;

monitor the particular device while the particular device is deployed, wherein the monitoring occurs in view of the quality metrics, wherein the monitoring is performed in view of algorithms that trigger customized maintenance triggers for the particular device developed from the quality metrics and diagnostic aspects; and trigger, responsive to detecting information corresponding to the particular device is violating at least one of the quality metrics, a notification to a user to perform an action corresponding to the particular device and the customized maintenance trigger.

11. The system of claim 10, wherein the inputs comprise at least one of: device attributes, attributes of an environment the particular device is within, and an application of the particular device.

12. The system of claim 10, wherein the composite index is derived from the parameter of the fluid measured by the particular device and other parameters of the fluid measured by other devices within a device system including the particular device.

13. The system of claim 10, wherein the monitoring is further performed in view of the diagnostic aspects.

14. The system of claim 13, wherein the triggering comprises triggering the notification based upon a deviation from the diagnostic aspects.

15. The system of claim 13, comprising validating, responsive to detecting a deviation from the diagnostic aspects during the monitoring, a performance of at least one other device in a system of a plurality of devices including the particular device using the deviation.

16. The system of claim 10, wherein the monitoring comprises monitoring outputs of the particular device against the quality metrics.

17. The system of claim 10, wherein the action comprises at least one: maintenance of the particular device, calibration of the particular device, and replacement of a component of the particular device.

18. A system for real-time management of device maintenance utilizing quality metrics defined based upon inputs of the device, the system comprising:

a plurality of devices that measure parameters of a fluid;

a memory storing instructions executable by a processor to:

receive inputs corresponding to a particular device within a system of a plurality of devices, wherein the particular device provides measurements of a parameter of a fluid, wherein the inputs correspond to attributes corresponding to a performance of the particular device;

generate, from the inputs, quality metrics for and unique to the particular device, wherein the generating comprises generating diagnostic aspects for and unique to the particular device, wherein the diagnostic aspects provide indicators of values corresponding to the inputs that indicate action with respect to the particular device is needed, wherein the quality metrics and diagnostic aspects are generated from performance parameters defined for the particular device and wherein the performance parameters are based upon a type of composite index that will be derived from the measurements provided by the plurality of devices;

monitor the particular device while the particular device is deployed, wherein the monitoring occurs in view of the quality metrics, wherein the monitoring is performed in view of algorithms that trigger customized maintenance triggers for the particular device developed from the quality metrics and diagnostic aspects; and trigger, responsive to detecting information corresponding to the particular device is violating at least one of the quality metrics, a notification to a user to perform an action corresponding to the particular device and the customized maintenance trigger.

\* \* \* \* \*